United States Patent
Schenk

(10) Patent No.: US 9,381,579 B2
(45) Date of Patent: Jul. 5, 2016

(54) POWER DRILL

(71) Applicant: Peter Schenk, Niederstotzingen (DE)

(72) Inventor: Peter Schenk, Niederstotzingen (DE)

(73) Assignee: ROEHM GMBH, Sontheim (DE)

( * ) Notice: Subject to any disclaimer, the term of this patent is extended or adjusted under 35 U.S.C. 154(b) by 128 days.

(21) Appl. No.: 14/301,597

(22) Filed: Jun. 11, 2014

(65) Prior Publication Data

US 2014/0377025 A1 Dec. 25, 2014

(30) Foreign Application Priority Data

Jun. 21, 2013 (DE) .......................... 10 2013 106 523

(51) Int. Cl.
*B23B 31/12* (2006.01)
*B23B 45/00* (2006.01)

(52) U.S. Cl.
CPC ............. *B23B 45/008* (2013.01); *B23B 31/123* (2013.01); *B23B 31/1253* (2013.01); *B23B 45/001* (2013.01); *B23B 2231/06* (2013.01); *B23B 2260/044* (2013.01); *B23B 2260/0445* (2013.01); *Y10T 279/17615* (2015.01); *Y10T 279/17623* (2015.01); *Y10T 279/17632* (2015.01); *Y10T 279/17658* (2015.01); *Y10T 279/3437* (2015.01); *Y10T 279/3451* (2015.01); *Y10T 408/72* (2015.01); *Y10T 408/953* (2015.01)

(58) Field of Classification Search
CPC ................... Y10T 279/3437; Y10T 279/3451; Y10T 279/17615; Y10T 279/17623; Y10T 279/17632; Y10T 279/17658; Y10T 279/32; B23B 2231/06
USPC ......................................................... 279/902
See application file for complete search history.

(56) References Cited

U.S. PATENT DOCUMENTS

| | | | | |
|---|---|---|---|---|
| 4,103,914 A * | 8/1978 | Rohm | ................. | B23B 31/1223 279/4.07 |
| 4,527,809 A * | 7/1985 | Umbert | ............... | B23B 31/1253 279/60 |
| 4,880,246 A * | 11/1989 | Rohm | ................. | B23B 31/1253 279/46.7 |
| 4,991,859 A | 2/1991 | Roehm | | |
| 5,464,230 A * | 11/1995 | Rohm | ................... | B23B 31/123 279/140 |
| 5,470,084 A * | 11/1995 | Reibetanz | ........... | B23B 31/1238 173/48 |
| 5,829,761 A * | 11/1998 | Rohm | ................. | B23B 31/1238 279/140 |
| 5,918,886 A * | 7/1999 | Horiuchi | ............... | B23B 31/008 279/58 |
| 6,536,782 B2 * | 3/2003 | Rohm | ................... | B23B 1/1238 279/62 |
| 7,726,917 B2 * | 6/2010 | Mack | .................... | B23B 31/123 279/140 |
| 2007/0182108 A1* | 8/2007 | Mack | ................... | B23B 31/1253 279/60 |

* cited by examiner

*Primary Examiner* — Daniel Howell
*Assistant Examiner* — Yasir Diab
(74) *Attorney, Agent, or Firm* — Andrew Wilford

(57) ABSTRACT

A power drill has a rotatable spindle extending from a power-unit housing, a chuck body rotationally fixed to the spindle, a jaw guide carried on the chuck body and rotatable relative thereto about the axis, jaws carried in the chuck body, and a pusher element rotatable about the axis in the chuck body and fixed to and bearing axially on the jaws. Screwthreads between the pusher element and the spindle is effective to move the jaws radially on rotation of the spindle about the axis relative to the guide. A coupling sleeve rotationally fixed to the jaw guide is movable between a tightening position rotationally fixed to the housing for movement of the jaws by the pusher element on rotation of the spindle and a drilling position rotationally fixed to the spindle and rotatable relative to the guide for joint rotation of the guide, jaws, and spindle.

15 Claims, 5 Drawing Sheets

POWER DRILL

FIELD OF THE INVENTION

The present invention relates to a power drill.

BACKGROUND OF THE INVENTION

A power drill is known comprising a power unit having a housing, a drill spindle and a drive coupled with the drill spindle, as well as a drill chuck having a jaw guide carrying chuck jaws and a chuck body connected to the drill spindle and connected via screwthreads to a pusher element for moving the chuck jaws.

Such power drills have already long since been known from the prior art and have proven their worth. For instance, U.S. Pat. No. 4,991,859 shows a drill chuck in which the chuck jaws can be opened or closed by relative rotation between an adjustment is sleeve and the chuck body. However, in order to open or close the chuck jaws, the adjustment sleeve must be grasped by the user and moved manually. This has proven disadvantageous, since the drilling tool to be clamped and the adjustment sleeve itself have to be grasped manually at the same time.

OBJECTS OF THE INVENTION

It is therefore an object of the present invention to provide an improved power drill.

Another object is the provision of such an improved power drill that overcomes the above-given disadvantages, in particular that provides a high level of comfort for the user.

SUMMARY OF THE INVENTION

A power drill has according to a drill spindle extending from a power-unit housing and rotatable about and centered on an axis, a chuck body rotationally fixed to the drill spindle, a jaw guide carried on the chuck body and rotatable relative thereto about the axis, jaws carried in the chuck body, and a pusher element rotatable about the axis in the chuck body and fixed to and bearing axially on the jaws. Screwthreads between the pusher element and the drill spindle is effective to move the jaws radially together on rotation of the spindle about the axis in a tightening direction relative to the guide and radially apart on opposite rotation of the spindle about the axis in a loosening direction. A coupling sleeve rotationally fixed to the jaw guide is movable between a tightening position rotationally fixed to the housing for movement of the jaws by the pusher element on rotation of the spindle and a drilling position rotationally fixed to the spindle and rotatable relative to the guide for joint rotation of the guide, jaws, and spindle.

In this way, it is possible to switch between the tightening position and the drilling position by simply moving the coupling sleeve. If the drive of the power unit is now actuated in the tightening position, a relative rotation occurs between the drill spindle and the jaw guide as a result of the jaw guide rotationally fixed to the housing, thus resulting in an opening or closing of the chuck jaws, independently of the direction of travel of the drive. The user of the power drill according to the invention need therefore merely hold onto the drilling tool to be clamped and actuate the drive of the power unit. In the drilling position, the drill spindle is rotationally coupled with the jaw guide, so inadvertent opening of the chuck jaws is suppressed. According to the invention, the coupling between the drill spindle and the jaw guide occurs indirectly or directly via the coupling sleeve.

It has proven to be especially advantageous if at least one recess is formed on the rear face of the jaw guide facing toward the drive for the configuration-independent formation of a positive fit with at least one lobe corresponding in shape and number to the at least one recess. As result, the permanent, rotationally fixed coupling of the coupling sleeve with the jaw guide of the drill chuck can be achieved in a simple and effective manner. The axial movability of the coupling sleeve is limited so that the lobes remain in constant engagement with the recesses in order to maintain the positive fit between the jaw guide and the coupling sleeve. It has also proven favorable in this regard if contact surfaces that laterally bound the at least one lobe formed on the coupling sleeve are not aligned parallel to each other. Particularly with radially extending contact surfaces, torque transfer between the coupling sleeve and the jaw guide is optimized.

It has also proven advantageous if external locking teeth are provided on the drill spindle in order to mesh with internal teeth of the coupling sleeve in the drilling position. Since such locking teeth can easily be manufactured, this has a positive impact on the manufacturing costs of the drill spindle and hence on the manufacturing costs of the entire drill chuck according to the invention. According to the invention, however, a provision is also made that the locking teeth are pressed onto the drill spindle or otherwise rotationally fixed to the drill spindle during assembly of the power drill.

For the functional reliability of the drill chuck according to the invention, it is also favorable if an elastic element is provided for biasing the coupling sleeve from the tightening position to the drilling position. In particular, inadvertent movement of the chuck jaws is suppressed by this, since the elastic element always biases the coupling sleeve from the tightening position to the drilling position. If the drill spindle has locking teeth, then the elastic element also offers the crucial advantage that, when the coupling sleeve is moved from the tightening position to the drilling position, if the locking teeth of the drill spindle and the teeth of the coupling sleeve are not axially aligned, on startup of the drill spindle the coupling sleeve is automatically moved axially by the tensioned elastic element, thus rotationally fixing the machine shaft to the drill spindle.

It is also especially favorable if a slip clutch is provided in the tightening position between the coupling sleeve and the housing. The slip clutch makes it possible to limit the clamping and release torque of the chuck jaws in a simple and effective manner. In particular, excessively high clamping forces are avoided as a result that would lead to the destruction of the tool to be clamped due to very hard clamping edges or of the clamping edges themselves. Furthermore, the chuck jaws are also effectively prevented in this way from becoming fixed in the jaw guide when retracting, as a result of which clamping would no longer be possible under some circumstances, thus rendering the power drill unusable. In this regard, it has also proven especially advantageous if the slip clutch is formed by a radially acting clutch ring that has on its outer periphery at least one entrainment seat for receiving a entrainment element that can be moved radially outward against the force of a biasing element. By virtue of the entrainment elements that are preferably formed as cylindrical coupling rollers according to the invention, the slip clutch is simple and cost-effective to manufacture, and it has also proven expedient when the number of entrainment elements corresponds to the number of entrainment seats.

According to the invention, it has also proven advantageous if the biasing element is formed by a leaf spring. This leaf spring that can be made of spring steel, for example, can have a groove for receiving the entrainment element. Through the appropriate selection of material, the longevity and the elastic deformability of the slip clutch can be ensured in particular. In this context, it has also proven expedient if the surface of the leaf spring facing away from the entrainment element is reinforced by vulcanized rubber in order to increase the coupling torque. By virtue of the vulcanized rubber that is advantageously made of rubber but also comprises other polymers, the coupling torque of the radial slip clutch can be increased simply and cost-effectively.

In addition, it has proven especially expedient if internal coupling teeth of the coupling sleeve mesh with coupling with external teeth of the coupling sleeve for rotational coupling. In this way, the coupling sleeve can be coupled with the slip clutch in a simple and effective manner. However, provision is made according to the invention that the coupling sleeve and the jaw guide are connected to each other by another type of positive fit. It is also advantageous if the coupling sleeve can be moved axially by a coupling wire coupled with a control ring carried on the housing. The coupling sleeve can thus be moved axially between the drilling position and the tightening position in a simple and effective manner by moving the control ring. According to the invention, movement of the control ring both angularly—i.e. rotation—and axially or a combination of the above-described movements is provided.

Forming the chuck body integrally with the drill spindle offers the advantage that top-heaviness of the power drill according to the invention is reduced simply and is effectively and, what is more, an extremely compact power drill can be realized.

It has also proven favorable if the drill chuck is surrounded by a shield collar of the housing and if an outer surface of the drill chuck is spaced from an inner surface of the shield collar. The shield collar serves to protect the user from rotating parts of the power drill, and according to the invention the shield collar extends axially over the entire length of the drill chuck. In this context, it has also proven expedient if the parts of the drill chuck rotating with respect to the housing are supported by the drill spindle. In this way, the power drill can easily be retrofitted to conventional power units without the need of elaborate operative modifications.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
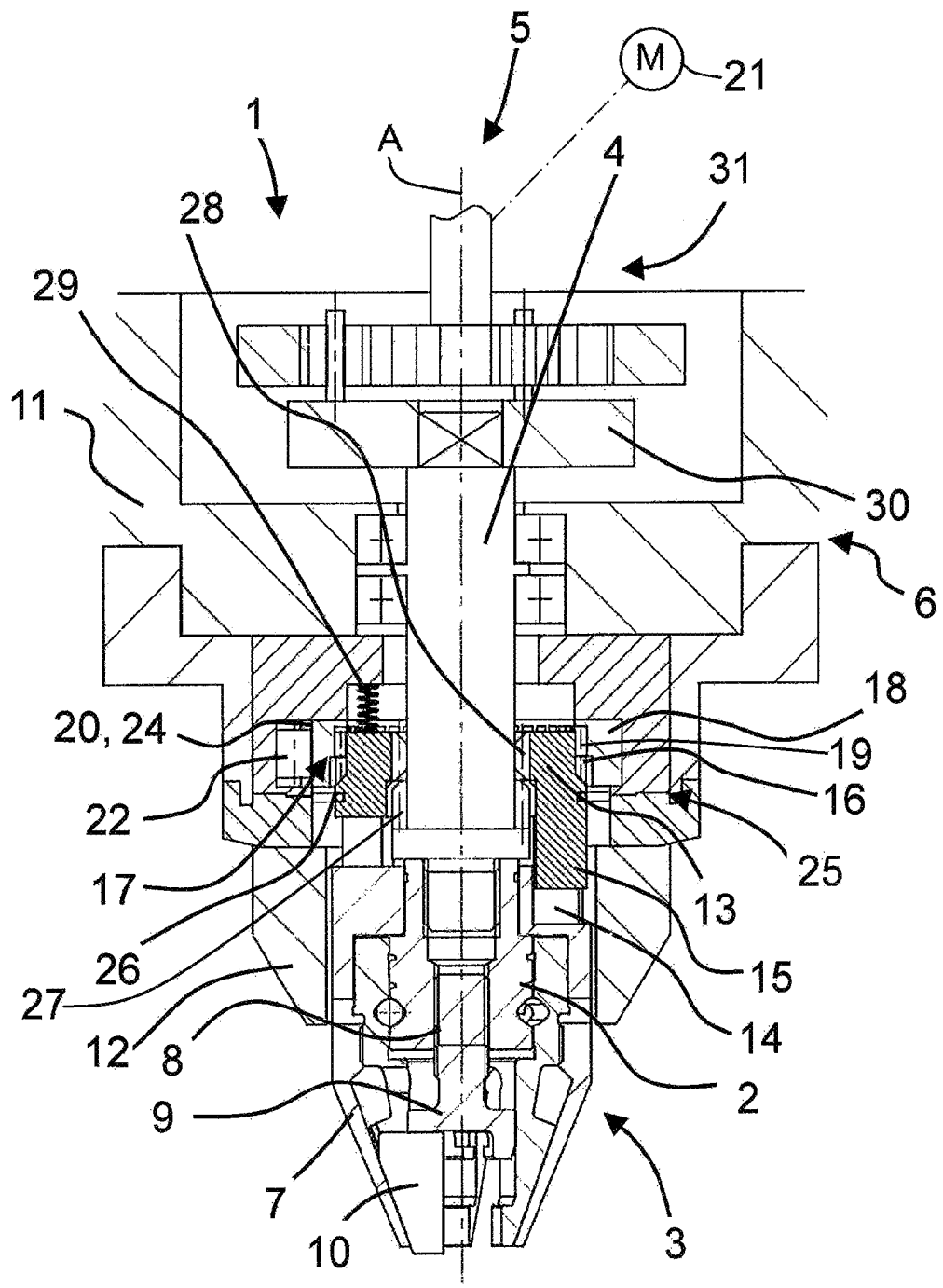
FIG. 1 is an axial section through a first embodiment of the power drill according to the invention in the tightening position.
Figure 2:
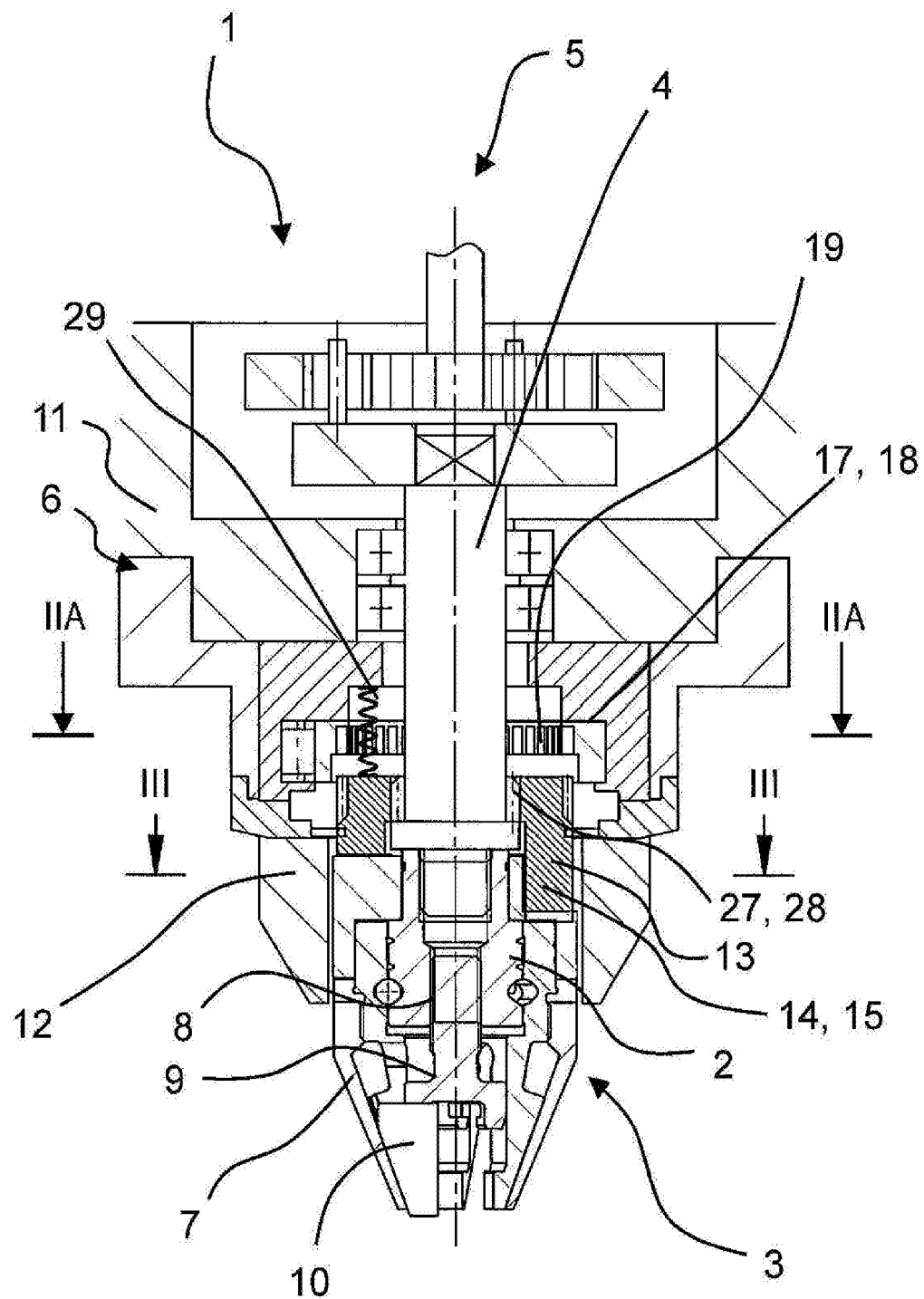
FIG. 2 is another axial section through the embodiment of FIG. 1 in the drilling position.

As seen in FIGS. 1 and 2 a power drill 1 according to the invention has a chuck body 2 that is part of a drill chuck 3 and coupled by a drill spindle 4 to a drive 5 of a power unit 6. The drill chuck 3, which is rotationally fixed to the spindle 4, also has a jaw guide 7 in which chuck jaws 10 can be moved axially and radially by a pusher element 9 connected by screwthreads 8 to the chuck body 2. The spindle 4 and drill chuck 3 are centered on and are rotated by a motor M in the unit 6 about an axis A.

The drill chuck 3 is supported on a housing 11 of the power unit 6 by the drill spindle 4 and is received in a cylindrical shield collar 12 of the housing 11. This shield collar 12 serves to protect the user, and a cylindrical outer surface of the drill chuck 3 is spaced from a cylindrical inner surface of the shield collar 12.

Figure 2A:
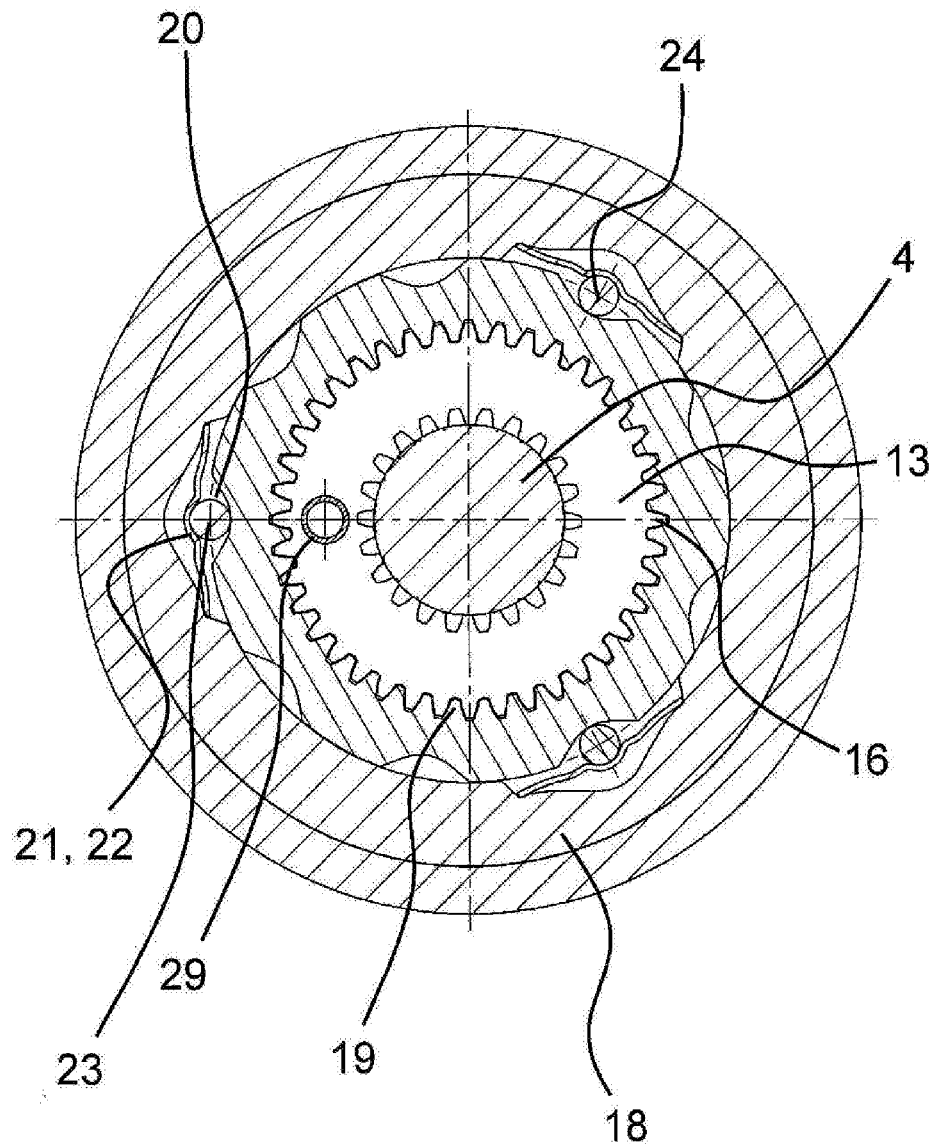
FIG. 2A is a section taken along line IIA-IIA of FIG. 2.

A coupling sleeve 13 is rotationally fixed to the jaw guide 7 and can be moved axially between a tightening/loosening position shown in FIG. 1 and a drilling position shown in FIG. 2. To couple the coupling sleeve 13 with the jaw guide 7, the jaw guide 7 has axially rearwardly open recesses 14 on its rear face directed toward the drive 5 and into which engage axially forwardly projecting lobes 15 formed on the coupling sleeve 13. In the tightening position, the coupling sleeve 13 is moved axially rearward toward the drive 5 and is positively rotationally coupled via external teeth 16 to a radially effective slip clutch 17 carried on the housing 11. The slip clutch 17 is coupled to the external teeth 16 of the outer surface of the coupling sleeve 13 via internal coupling teeth 19 (see FIG. 2A) formed in the inner surface of a clutch ring 18. The clutch ring 18 in turn has on its outer periphery a plurality of entrainment seats 20 receiving respective entrainment elements 23 that can be moved radially against the force of respective biasing elements 22 formed as leaf springs, the entrainment elements 24 being formed as cylindrical coupling rollers in the illustrated embodiment.

To move the coupling sleeve 13 between the tightening position (FIG. 1) and the drilling position (FIG. 2), a control ring 25 carried on the housing 11 is provided in a known manner that is coupled with the coupling sleeve 13 by a coupling wire 26 in order to move the coupling sleeve 13 axially.

If the drive 5 is operated in the tightening position, the drill spindle 4 rotates relative to the jaw guide 7 that is rotationally fixed to the housing 11 via the coupling sleeve 13 coupled with the slip clutch 17. The jaw guide 7 carrying the chuck jaws 10 rotates relative to the pusher element 9 and the chuck body 2 rotationally fixed to the drill spindle 4, as a result of which the pusher element 9 is screwed axially and the chuck jaws 10 in the jaw guide 7 also move axially and, in addition, radially.

When tightening, once the chuck jaws 10 come to rest against a tool to be clamped (not shown in the drawing), the slip clutch 17 releases when its torque-transmitting limit is exceeded. The coupling rollers 24 move radially outward out of the entrainment seats 20 against the leaf springs 22 and release the clutch ring 18. The clutch ring 18 and the coupling sleeve 13 connected to it rotate with the jaw guide 7. As a result, further tensioning of the chuck jaws 10 is prevented once the maximum clamping force is reached. Upon a change in rotation direction of the drive 5—i.e. on opening of the chuck jaws—the slip clutch 17 is also released once the release torque of the slip clutch 17 is reached, as described above. The jaw guide 7 thus rotates with the clutch ring 18 and the coupling sleeve 13 connected to it. Therefore, no further movement of the chuck jaws 10 occurs once the maximum release torque is reached.

External locking teeth 27 are formed on the drill spindle 4 that serve to rotationally couple the drill spindle 4 with internal locking teeth 28 of the coupling sleeve 13 in order to prevent relative rotation between the jaw guide 7 and the drill spindle 4 in the drilling position. In the tightening position, the coupling sleeve 13 is acted upon by an elastic biasing element 29 that is supported in the illustrated embodiment on a planet-gear carrier 30 of a planetary-gear transmission 31 forming the drive 5, as a result of which a force is always acting upon the coupling sleeve 13 in the tightening position that moves the coupling sleeve 13 axially out of the tightening position into the drilling position. This is advantageous particularly if, while actuating the coupling sleeve 13 with the control ring 25, the external locking teeth 27 on the drill spindle 4 are not aligned axially with the teeth 28 of the coupling sleeve 13. On startup of the drive 5, the coupling sleeve 13 is urged by the elastic element 29 into the locking teeth 27 of the drill spindle 4, thus rotationally coupling the drill spindle 4 with the jaw guide 7.

In the drilling position shown in FIG. 2, the coupling sleeve 13 is moved axially toward the chuck jaws 10 and engages with the teeth 28 in the external locking teeth 27 of the drill spindle 4. As a result, in the drilling position, the jaw guide 7 is rotationally fixed to the drill spindle 4 via the coupling sleeve 13. If the drill spindle 4 is now rotated by the drive 5, the jaw guide 7 is also driven. Consequently, no relative rotation can occur between the drill spindle 4 and the jaw guide 7, thus ruling out movement of the chuck jaws 10 and loosening of their grip on the tool.

Figure 3:
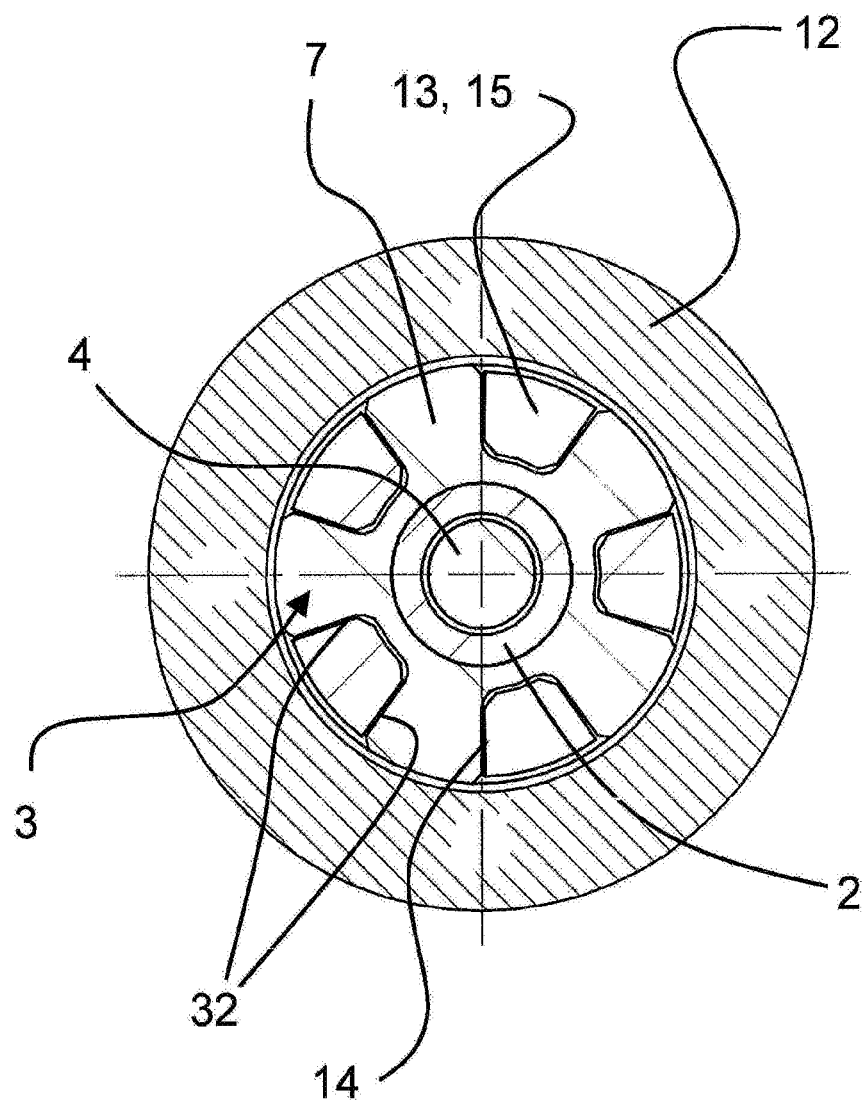
FIG. 3 is a large-scale section taken along line III-III of FIG. 2.

FIG. 3 particularly illustrates the structure of the recesses 14 formed on the jaw guide 7 and of the complementary respective lobes 15 formed on the coupling sleeve 13 and engaged in the recesses 14 in order to form a permanent positive fit between the coupling sleeve 13 and the jaw guide 7 while nonetheless allowing axial movability of the coupling sleeve 13 relative to the jaw guide 7. FIG. 3 also shows that the contact surfaces 32 that flank the lobes 15 laterally are not parallel to each other, but rather extend radially in order to optimize the transfer of torque between the coupling sleeve 13 and the jaw guide 7. FIG. 3 also shows clearly that the cylindrical outer surface of the drill chuck 3 is spaced radially inward from the inner cylindrical surface of the shield collar 12.

Figure 4:
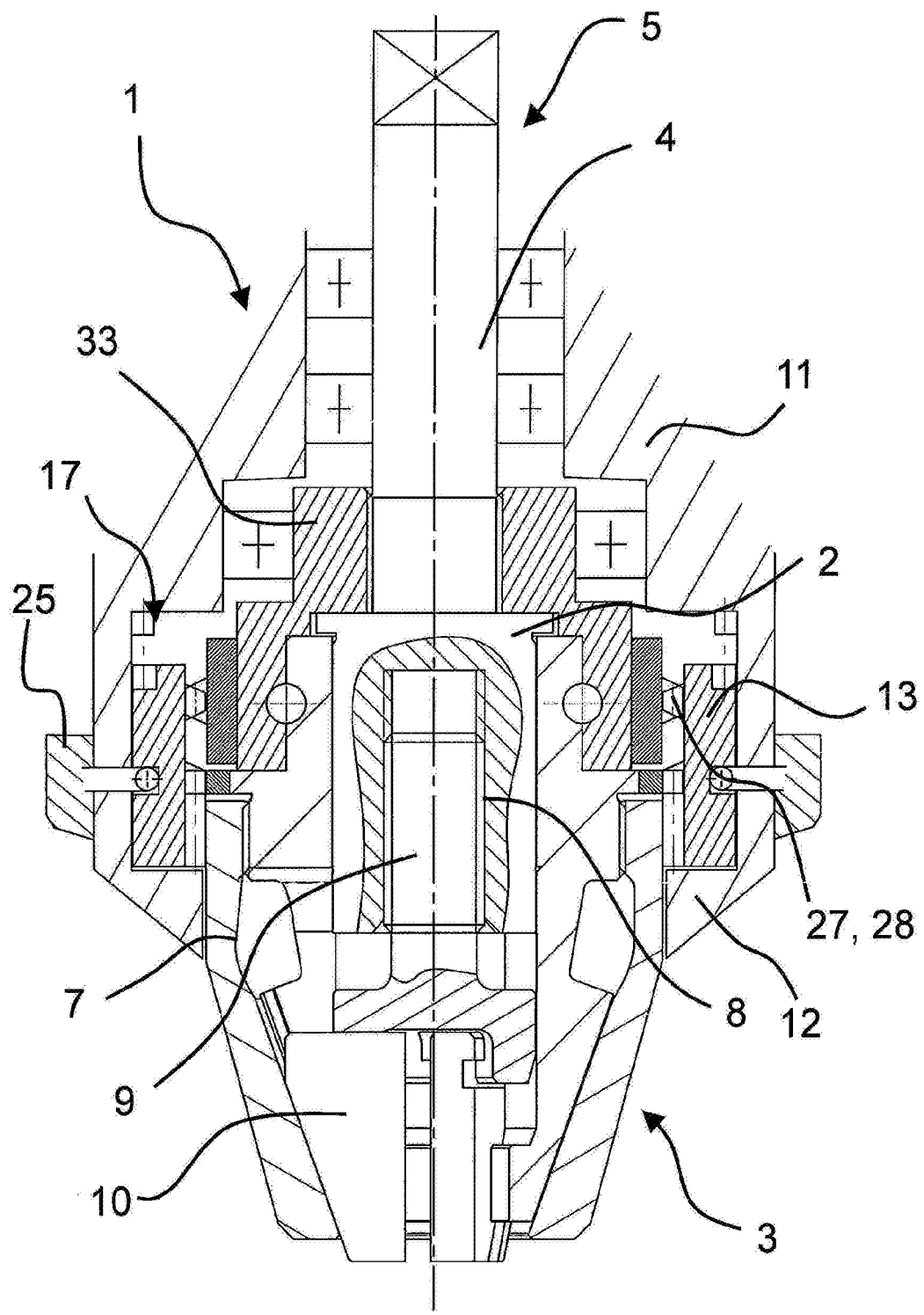
FIG. 4 is an axial section through another embodiment of the drill of this invention.

FIG. 4 shows another embodiment of the power drill 1 according to the invention, where the chuck body 2 is formed integrally with the drill spindle 4. In the illustrated embodiment, the locking teeth 27 carried on an intermediate sleeve 33 that is formed as a separate component and rotationally and axially coupled to the drill spindle 4. The intermediate sleeve 33 carrying the locking teeth 27 is here shaped like a pot in order to receive the jaw guide 7 between the intermediate sleeve 33 and the drill spindle 4.

The manner in which the power drill 1 according to the invention functions will be explained once again below. In the tightening position shown in FIG. 1, the coupling sleeve 13 is connected via the radially acting slip clutch 17 to the housing 11 and, upon actuation of the drive 5, relative rotation occurs between the drill spindle 4 and the coupling sleeve 13. Using the spindle drive formed by the pusher element 9 and the chuck body 2, the chuck jaws 10 guided in the jaw guide 7 can now be opened or closed, depending on the rotation direction of the drive 5.

If the coupling sleeve 13 is moved axially by the coupling wire 26 by actuation of the control ring 25 and brought out of engagement with the radial slip clutch 17, the coupling sleeve 13 is brought into engagement with the drill spindle 4 via the meshing of the teeth 28 with the locking teeth 27. The power drill 1 is now in the drilling position as shown in FIG. 2. As a result of coupling of the jaw guide 7 and drill spindle 4, relative rotation between these components is suppressed, thus ruling out inadvertent release of the chuck jaws 10.

I claim:

1. A power drill comprising:
a power-unit housing;
a drill spindle extending from the housing and rotatable about and centered on an axis;
a chuck body rotationally fixed to the drill spindle;
a jaw guide carried on the chuck body, formed with at least one axially rearwardly open recess, and rotatable relative thereto about the axis;
jaws carried in the chuck body;
a pusher element rotatable about the axis in the chuck body and fixed to and bearing axially on the jaws;
screwthreads between the pusher element and the drill spindle effective to move the jaws radially together on rotation of the spindle about the axis in a tightening direction relative to the guide and radially apart on opposite rotation of the spindle about the axis in a loosening direction;
a coupling sleeve rotationally fixed to the jaw guide, formed with a forwardly projecting lobe complementarily received and axially shiftable in the recess, and movable between a tightening position rotationally fixed to the housing for movement of the jaws by the pusher element on rotation of the spindle and a drilling position rotationally fixed to the spindle and rotatable relative to the guide for joint rotation of the guide, jaws, and spindle.

2. The power drill defined in claim 1, wherein there are a plurality of the recesses angularly equispaced on a rear face of the guide and the coupling sleeve has a plurality of the lobes each engaged in a respective one of the recesses.

3. The power drill defined in claim 1, wherein the recess and the lobe have confronting side flanks that lie in planes including the axis and that engage each other in surface contact.

4. A power drill comprising:
a power-unit housing;
a drill spindle extending from the housing, formed with external locking teeth, and rotatable about and centered on an axis;
a chuck body rotationally fixed to the drill spindle;
a jaw guide carried on the chuck body and rotatable relative thereto about the axis;
jaws carried in the chuck body;
a pusher element rotatable about the axis in the chuck body and fixed to and bearing axially on the jaws;
screwthreads between the pusher element and the drill spindle effective to move the jaws radially together on rotation of the spindle about the axis in a tightening direction relative to the guide and radially apart on opposite rotation of the spindle about the axis in a loosening direction;
a coupling sleeve rotationally fixed to the jaw guide and movable between a tightening position rotationally fixed to the housing for movement of the jaws by the pusher element on rotation of the spindle and a drilling position rotationally fixed to the spindle and rotatable relative to the guide for joint rotation of the guide, jaws, and spindle, the coupling sleeve being formed with complementary internal locking teeth that mesh with and can shift axially in the internal locking teeth in both the tightening and drilling position.

5. The power drill defined in claim 4, further comprising:
a biasing element braced between the housing and the coupling sleeve and continuously urging the coupling sleeve from the tightening position into the drilling position.

6. The power drill defined in claim 1, further comprising:
a slip clutch engaged between the coupling sleeve and the housing only in the tightening position.

7. The power drill defined in claim 6, wherein the slip clutch includes:
a clutch ring;
at least one radially outwardly open entrainment seat formed on the clutch ring;
an entrainment element fittable in the seat; and
spring means urging the entrainment element radially inward toward the clutch ring.

8. The power drill defined in claim 7, wherein the spring means is a leaf spring.

9. The power drill defined in claim 8, wherein a surface of the leaf spring facing radially outward away from the entrainment element is reinforced by a vulcanized rubber.

10. The power drill defined in claim 7, wherein the ring has internal teeth meshing with external teeth of the coupling sleeve only in the tightening position.

11. A power drill comprising:
a power-unit housing;
a drill spindle extending from the housing and rotatable about and centered on an axis;
a chuck body rotationally fixed to the drill spindle;
a jaw guide carried on the chuck body and rotatable relative thereto about the axis;
jaws carried in the chuck body;
a pusher element rotatable about the axis in the chuck body and fixed to and bearing axially on the jaws;
screwthreads between the pusher element and the drill spindle effective to move the jaws radially together on rotation of the spindle about the axis in a tightening direction relative to the guide and radially apart on opposite rotation of the spindle about the axis in a loosening direction;
a coupling sleeve rotationally fixed to the jaw guide and movable between a tightening position rotationally fixed to the housing for movement of the jaws by the pusher element on rotation of the spindle and a drilling position rotationally fixed to the spindle and rotatable relative to the guide for joint rotation of the guide, jaws, and spindle;
a control ring carried on the housing; and
an elastically deformable coupling wire between the coupling sleeve and the control ring for shifting the coupling sleeve between the tightening and drilling positions on rotation of the control ring about the axis.

12. The power drill defined in claim 1, wherein the chuck body is formed integrally with the spindle.

13. The power drill defined in claim 1, wherein the housing is formed with a shield collar annularly surrounding the drill chuck and projecting axially outward from the housing.

14. The power drill defined in claim 13, wherein the shield collar has a cylindrical inner surface spaced radially from a cylindrical outer surface of the jaw guide.

15. The power drill defined in claim 1, wherein the chuck body, jaw guide, jaws, and pusher element are all carried on the spindle and are indirectly supported on the housing via the spindle.

* * * * *